Oct. 15, 1963   H. W. MOUGEY   3,107,121
RETRACTABLE SAFETY BELT FOR VEHICLES
Filed June 27, 1962

INVENTOR.
HERALD W. MOUGEY
BY
Oldham & Oldham
ATTYS.

United States Patent Office 3,107,121
Patented Oct. 15, 1963

3,107,121
RETRACTABLE SAFETY BELT FOR VEHICLES
Herald W. Mougey, Rittman, Ohio, assignor of fifty percent to Charles A. Jennings, Cleveland, Ohio
Filed June 27, 1962, Ser. No. 205,652
4 Claims. (Cl. 297—388)

This invention relates to retractable safety belts for vehicles, and especially to a means for assembly of a safety belt to a seat of a vehicle so as to retract the safety belt when inoperative, but to permit full normal operative positioning and use of the safety belt when desired.

Heretofore the use of safety belts in vehicles has been widely proposed and recommended by various safety groups and organizations. The use of these safety belts in vehicles of all types hence is increasing continually. However, when these safety belts are inoperatively positioned, as when one is getting into or out of a vehicle, the loose flapping portions of the safety belt in the vehicle seat are undesirable. Or, in some instances, one may not care to use the safety belt, or possibly there is only one rider in a car and two safety belts have been provided. Thus, these loose or flapping ends of the safety belts sometimes interfere with the closing of a vehicle door, or they make it difficult for a passenger to slide over the seat from one side thereof to the other, or they are objectionable in general as unsightly. Some people do not provide safety belts in their vehicles because of the above and other disadvantages produced by the loose safety belt portions when not in use.

In general, safety belts are attached to the floor of a vehicle and then extend up through the back or around the sides of the seat to provide two loose end portions for attachment with each other around a passenger to secure the passenger to the seat.

Some efforts have been made heretofore to provide retractable means of one type or another for association with safety belts to retract portions thereof when the belts are not in use. However, insofar as I am aware, none of such previous types of retractable means have been completely satisfactory. The previous means provided may have interfered with the free movement of the vehicle seat for adjustment purposes, the retractable means may have been relatively expensive, the retractable means may have been cumbersome in size or difficult to install, or they have not been acceptable for other reasons.

The general object of the present invention is to provide means for association with safety belts wherein a combination can be provided in a vehicle by which portions of the safety belt member can be readily retracted in the means of the invention to provide only the ends of the safety belt exposed on the seat for ready grasp by a passenger to attach the safety belt to himself for operative positioning of the safety belt.

Another object of the invention is to provide a frame member having retractable slide means therein for resiliently and automatically storing undesired lengths of a safety belt, when inoperative, but to have the safety belt be readily available under minimum tension conditions on the safety belt to permit the safety belt to be operatively positioned.

A further object of the invention is to provide a relatively inexpensive, uncomplicated box-type frame means for engaging a seat belt to removably store desired lengths of a seat belt therein when the seat belt is inoperative, and which means can be readily engaged with the lower surface of the springs of a vehicle seat to be carried thereby.

The foregoing and other objects and advantages of the invention will be made more apparent as the specification proceeds.

When referring to corresponding members shown in the drawings and referred to in the specification, corresponding numerals are used to facilitate comparison therebetween.

In the accompanying drawings.

Figure 1:
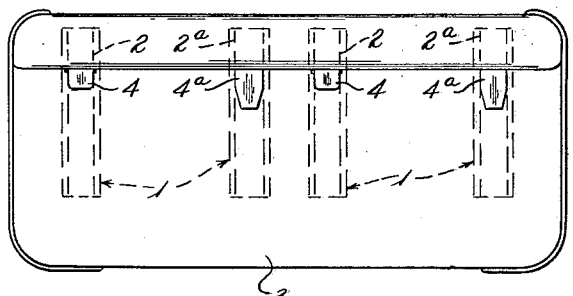
FIG. 1 is a plan view of an automobile seat having apparatus embodying the principles of the invention operatively associated therewith.

This invention, generally speaking, relates to a retractable apparatus engageable with an automobile vehicle seat belt for providing automatic retraction thereof when the seat belt is not in use, and which apparatus comprises an elongate frame having front and rear ends and attachable to the under surface of a seat to normally extend in a direction from front to rear thereof, a slide means operatively carried by the frame for longitudinal movement therein, means on the slide means and adapted to have a seat belt loop therearound for receiving a portion of the seat belt in said elongate frame, and spring means connected between the slide means and the frame to normally retain the slide means adjacent the front end of the frame, the means on the slide means being movable rearwardly of the apparatus until the seat belt can extend in an operative straight line free from interference with the retractable apparatus of the invention.

Attention now is particularly directed to the details of the structure shown in the accompanying drawings, and an automatic retractable apparatus embodying the principles of the invention is indicated as a whole by the numeral 1. Each one of these automatic retractable apparatuses 1 is adapted to have a seat belt 2 associated therewith when the apparatus is operatively positioned in association with means, such as an automobile seat 3. It is realized that it takes a pair of the seat belts 2 and 2a to engage with a person and conventional engagement or buckle means indicated at 4 and 4a are provided on the ends of the seat belts shown for providing a safety loop from a pair of the associated seat belts 2 and 2a. Normally the apparatus 1 is positioned to extend from front to rear of the automobile seat 3, and means such as hooks 5 of any suitable construction can be provided in association with a frame 6 of the automatic retractable apparatus 1 to secure such frame to the lower, or under surface of the automobile seat 3. Usually the lower surfaces of these seats 3 have some suitable spring means associated therewith and where at least portions of such spring means are exposed under the seats whereby the hooks 5 can be conveniently engaged therewith to support the frame 6 below the seat for operative association therewith. Normally the frame 6 extends to a point slightly forward from the rear end of the seat. The floor 7 of the vehicle in which the seat 3 is positioned is shown and one end of each of the seat belts 2 is secured to such floor 7, as by means of an anchor member 8 of any conventional construction.

Figure 4:
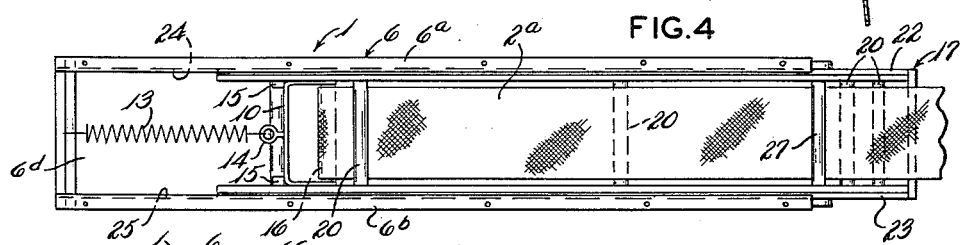
FIG. 4 is a top plan view of the seat belt retracting apparatus of FIG. 3 with the top of the frame for the apparatus removed.

It is an important feature of the invention that the automatic retractable apparatus 1 is made for normally storing appreciable length portions of the seat belts 2 and 2a intermediate the ends thereof when the seat belts are inoperatively positioned. To achieve this result, the elongate frame 6 has a slide means 9 positioned therein for movement longitudinally of the frame 6 and with the seat belt 2 being looped around a means carried by the slide 9 to retract a section or length of the seat belt into the frame 6 when the seat belt is inoperative. The slide 9 may comprise a means, such as a substantially U-shaped member 10, that is received in a pair of opposed grooves 11 and 12 formed in, or in members operatively associated with side portions of the frame 6 whereby the member 10 can be moved longitudinally from, for example, the position shown in FIG. 4 to a position at the rear end of the frame 6. The slide 9 normally is urged forwardly of the frame 6 by a spring 13 connected between a front portion of the frame 6 and, for example, a hook 14 carried by the slide member 10. A stop means 15 is shown formed on or operatively secured to the portions of the frame 6 in which the grooves 11 and 12 are formed to limit forward movement of the slide in the frame assembly. Usually the member 10 includes a roller means, such as a roll 16, that is suitably journalled thereon and extends transversely thereof so that the seat belt 2, as shown, can be looped therearound to pull a section of the seat belt into the frame 6.

In order to obtain freer release movement of the seat belt 2, and to provide improved slide and storage action, the automatic retractable apparatus 1 is shown as including a slide frame 17. Such slide frame 17 preferably is of box-like shape and includes a pair of side rails 18 and 19 that may have a plurality of transversely extending members 20 secured thereto and extending therebetween to form a sturdy slide frame unit in the apparatus.

Figure 5:
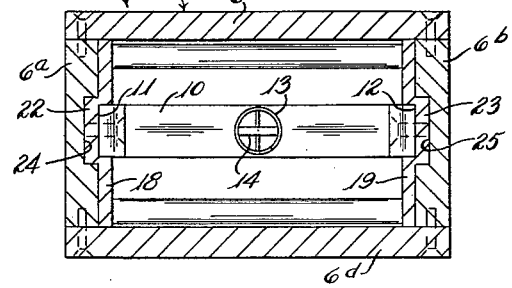
FIG. 5 is an enlarged vertical section taken on line 5—5 of FIG. 3.

FIG. 5 of the drawings best shows that these side rails 18 and 19 have the grooves 11 and 12 provided therein for receiving the member 10 for longitudinal sliding action, whereas the slide frame 17 itself has protruding longitudinally extending ribs 22 and 23 formed on the laterally outer surfaces of the side rails 18 and 19. Such ribs themselves are received in longitudinally extending grooves 24 and 25, respectively, formed in inner surfaces of walls of the frame 6 so that the slide frame 17 can freely move longitudinally in the apparatus.

Usually the slide frame 17, or means associated therewith, has some type of belt support or positioning means associated therewith for engaging the seat belt 2, as threaded through the apparatus 1 to be engaged therewith. Such means are shown to comprise a lower roll 26 and an upper roll 27 that are journalled on the slide frame 17 adjacent the rear end thereof. The apparatus is so constructed and arranged that the slide member 10 can move to the rear in the frame 6 to a point where the roller 16 can be moved rearwardly past the rolls 26 and 27 so that the seat belt 2 can extend through the apparatus 1 in a substantially straight line without any interference therefrom for operatively positioning the seat belt when engaged with a person on the seat 3. Such action is permitted by the coil spring 13 which is selected of a size and gage that it does not set up objectionable tension on the seat belt 2 by such slide action and spring extension. Usually the rolls 26 and 27 are in substantial vertical alignment and the upper roll 27 may be positioned slightly forwardly from the rear roll so that the seat belt 2 can be readily moved from engagement therewith when it extends up around the back edge portion of the seat 3 for operative positioning.

Usually the frame 6 provided for the apparatus 1 is of substantially an open box-like shape and has side portions 6a and 6b provided therein and opposed top and bottom portions 6c and 6d provided in the frame. Naturally these various portions of the frame 6 can be secured together in any desired manner. Likewise, the slide frame 17 can have the components thereof secured together in any desired manner, and the entire frame 6, and slide frame 17, as well as the slide 9, can be made from any suitable materials, such as plastic, metal, or other substances.

Figure 2:
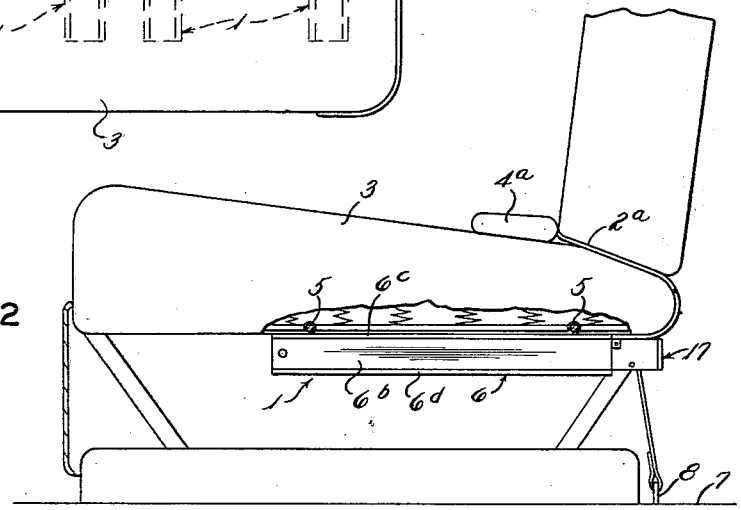
FIG. 2 is an enlarged side elevation of the seat of FIG. 1, with a portion of the seat broken away and with some of the seat being shown in vertical section.

While the apparatus as shown in the drawings includes pairs of the automatic retractable apparatus indicated as extending from front to rear of the seat 3, in some instances, it may be desirable to associate a pair of the seat belt retracting means positioned to extend transversely of a seat where individual seats are provided and then the seat belts would extend up around the lateral margins of the seat, rather than extending up between the back and base portions of the seat 3, as shown in FIG. 2. Usually enlarged buckle portions 4 are provided on the ends of the seat belts 2 and 2a to prevent their being pulled through the joint between the back and base portions of the seat 3 to assume the normal position shown in FIG. 2 when inoperative. Also, the apparatus 1 is designed to only have such retraction action.

Figure 3:
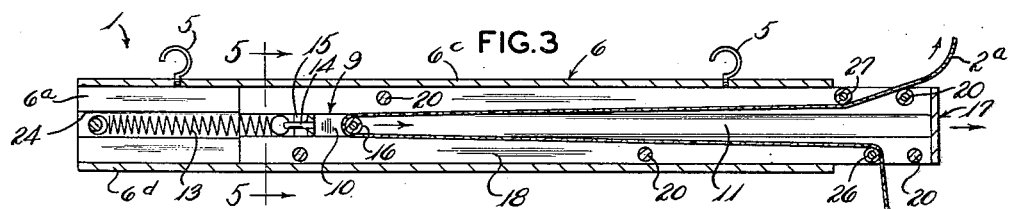
FIG. 3 is an enlarged longitudinal vertical section of the seat belt retracting means shown in FIGS. 1 and 2.

FIG. 3 of the drawings best shows that the slide frame 17 may extend from the rear end portion of the frame 6 when the seat belt is operatively positioned. Such slide frame may itself move further to the rear to facilitate operative positioning of the seat belt and to permit the seat belt to extend in a straight line from the anchor member 8 up to the rear edge portion of the seat 2 and, in effect, remove the automatic retractable apparatus 1 from engagement with the seat belt when in operation.

From the foregoing, it is believed that it will be seen that an automatic retractable apparatus has been provided for a seat belt for use in any suitable vehicle. A slide unit of one or two relatively movable members is present in the apparatus for intermittent automatic storage action for portions of the lengths of seat belts, when inoperative. These seat belts will be retracted automatically when inoperative, but are free for operative positioning when desired. The apparatus of the invention is relatively inexpensive to produce and it may have two superimposed slide units of the invention positioned in a frame to provide a shorter frame for positioning the storage means of the invention. In some instances, two slide means can be positioned in one frame to position a pair of seat belts, for example, in a frame that extends transversely of a bucket seat with the belts operatively associated with each end of the frame to extend up around the sides of a seat.

While one complete embodiment of the invention has been disclosed herein, it will be appreciated that modification of this particular embodiment of the invention may be resorted to without departing from the scope of the invention, as defined in the appended claims.

What I claim is:

1. An automatic retractable apparatus for a seat belt and comprising in combination,
    an elongate frame having front and rear ends and attachable to the under surface of an automobile seat to extend in a direction of front to rear thereof,
    a slide means operatively carried by and positioned within said frame for longitudinal movement therein,
    a roller journalled on said slide means and adapted to have a portion of said seat belt received within said frame and looped around said roller for storage of a portion of said seat belt within said frame,
    coil spring means connected between said slide means and said frame front end to normally retain said slide means adjacent said front end, and
    upper and lower roll means operatviely positioned adjacent the rear end of said frame for engaging a seat belt to guide it to said frame for storage,
    said coil spring means, slide means and any stored looped portion of said seat belt being on a common longitudinal axis,
    said roller on said slide means being movable rearwardly until a seat belt engaging said frame can be operatively freed from the apparatus.

2. An automatic retractable apparatus for a seat belt and comprising in combination,
    an elongate frame having front and rear ends and being attachable to an automobile seat, a slide means operatively carried by and positioned within said frame for longitudinal movement therein, a roller journalled on said slide means and adapted to have a portion of said seat belt received within said frame and looped around said roller for storage of a portion of said seat belt within said frame, coil spring means connected between said slide means and a front end portion of said frame to normally retain said slide means adjacent said front end, and upper and lower guide means operatively positioned adjacent the rear end of said slide means for engaging a seat belt to guide it to said frame for storage therein, said coil spring means, slide means and any stored looped portion of said seat belt being on a substantially common longitudinal axis, said roller on said slide means being movable rearwardly in said frame until a seat belt engaging said frame can extend in a straight line from an anchored end thereof when operatively positioned to the seat with which the apparatus is associated.

3. An automatic retractable apparatus for a seat belt and comprising in combination, a seat belt one end of which is attachable to an anchor means, an elongate frame having front and rear ends attachable to a vehicle seat, a pair of independent slide means operatively carried by and positioned within said frame for independent longitudinal movement therein, roller means journalled on each of said slide means with said seat belt looped therearound to store varied lengths of said seat belt in said frame from the rear end thereof dependent upon the positions of said slide means in said frame, and spring means operatively connected between said slide means and the front end of said frame to normally retain said slide means adjacent said front end, said roller means on said slide means being movable rearwardly until said seat belt can extend in at least a substantially straight line from an anchored end thereof, when operatively positioned, through the said apparatus to the seat with which said seat belt is associated, said pair of slide means having telescopic movement with relation to each other to aid in belt storage and release by a compact frame.

4. An automatic retractable apparatus for a seat belt and comprising in combination, an elongate frame having front and rear ends attachable to a vehicle seat, a pair of independent slide means operatively carried by and positioned within said frame for independent longitudinal movement therein, roller means journalled on one of said slide means and adapted to have a seat belt operatively engaged therewith to store varied lengths of said seat belt in said frame from the rear end thereof dependent upon the positions of said slide means in said frame, spring means operatively connected between said one of said slide means and the front end of said frame to normally retain said slide means adjacent said front end, and guide means for engaging a seat belt positioned on the other of said pair of slide means, said roller means on said one slide means being movable rearwardly until said seat belt can extend in at least a substantially straight line from an anchored end thereof, when operatively positioned, through the said apparatus to the seat with which said seat belt is associated, said pair of slide means having telescopic movement with relation to each other to aid in belt storage and release in a compact frame.

References Cited in the file of this patent

UNITED STATES PATENTS 2,963,080     Zang  ---------------- Dec. 6, 1960